Dec. 12, 1967

M. J. H. STAAR 3,357,303

COMBINED APPARATUS FOR PROJECTING SLIDES AND RECORDING PLAYING SOUND TAPES

Filed May 10, 1965

5 Sheets-Sheet 1

Dec. 12, 1967 M. J. H. STAAR 3,357,303

COMBINED APPARATUS FOR PROJECTING SLIDES AND RECORDING PLAYING SOUND TAPES

Filed May 10, 1965

5 Sheets-Sheet 5

United States Patent Office 3,357,303

Patented Dec. 12, 1967

3,357,303

COMBINED APPARATUS FOR PROJECTING SLIDES AND RECORDING AND PLAYING SOUND TAPES

Marcel Jules Hélène Staar, Rhode-Saint-Genese, Belgium, assignor to Usines Gustave Staar S.A., Brussels, Belgium Filed May 10, 1965, Ser. No. 454,277
Claims priority, application Belgium, May 11, 1964, 647,746
10 Claims. (Cl. 88—28)

ABSTRACT OF THE DISCLOSURE

A slide projector in combination with a detachable device for recording and playback of sound on tape, wherein the slide projector is provided with a slot in which the sound recording and playback device is detachably engaged and thereby positioned and energized such that when a slide frame is moved into operative position in the projector for optical projection of the slide therein, a tape carried in a recess of the slide frame is operatively positioned to be recorded or played back by the recording and playback means.

This invention relates to a combined apparatus for projecting slides and recording or playing sound tapes stored in a recess in the slide mounting frame.

It is an object of the invention to provide between the optical projection system and the sound system a relationship such that the owner of a conventional slide projector can readily and economically adapt it for the projection of sound slides but still be able to use it whenever required as a conventional projector.

The combined apparatus according to the invention comprises a conventional slide projector and a device for recording and playing sound tape stored in a cassette, the projector and the device being so combined that, when the slide frame is in the operative position relatively to the means for projecting the slide, the tape borne by such frame is in the operative position relatively to the device for recording or playing such tape.

In a practical form of the invention, the projector retains all its conventional functions for projecting the normal kind of slides, and the slide and the tape are brought to the operative position by the conventional operation for bringing a conventional slide mounting frame to the operative position. The common operative position is the result of the registering positions of the slide and of the recess for the tape and of the corresponding registering positions of the optical equipment and sound equipment.

For ready combination of such projector with a device for recording and playing a sound tape, the cover of the slide projector can be formed with a slot adapted for the introduction of a foot borne by the device for recording or playing the sound tape, for co-operation with a receptacle forming part of the optical projector.

For a better understanding of the invention, a nonlimitative embodiment thereof will be described hereinafter with reference to the accompanying drawings wherein:

FIG. 12 is a section on the line XII—XII of FIG. 13;

FIG. 13 is a section on the line XIII—XIII of FIG. 12, and FIGS. 14–16 are views in horizontal section of details.

FIG. 1 shows a slide projector of the kind formed with a channel 4 in which a slide magazine (not shown in FIG. 1) can move. A slider 5 removes slides from the magazine one by one to move them to the place where they co-operate with the optical system of the projector, and then to return them from such place to their position in the magazine.

Figure 3:
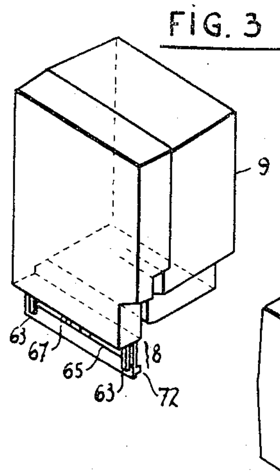
FIG. 3 is a perspective view of such device.

In order that a conventional slide projector of this kind may readily be combined with a device for recording and playing sound tapes stored in a cassette, a cover 6 of a casing 1 of the slide projector is, in accordance with the invention, formed with an aperture or slot 7 (FIG. 1) adapted for the introduction of a foot 8 disposed at the bottom part of a frame 60 of a device for recording and playback of a sound tape received in a casing 9. Preferably, the aperture 7 is disposed at a place where it is wide enough to pass a slide frame formed with a recess for a sound tape.

The device for recording and playing sound tape can be of the kind described and protected by the applicant's Belgian Patent No. 647,272 filed Apr. 29, 1964.

This invention is illustrated and will be described, but non-limitatively, with reference to the use of such a device and to the use of mounting frames 10 (FIGS. 4 and 6) formed with a recess 11 for storing a sound tape 12, for instance, as described in the applicant's U.S. patent application No. 361,746 filed Apr. 22, 1964. The cassette can also be embodied as described in applicant's U.S. patent application No. 454,355 and can have provision for a ready semi-permanent or permanent connection to a slide frame.

Figure 4:
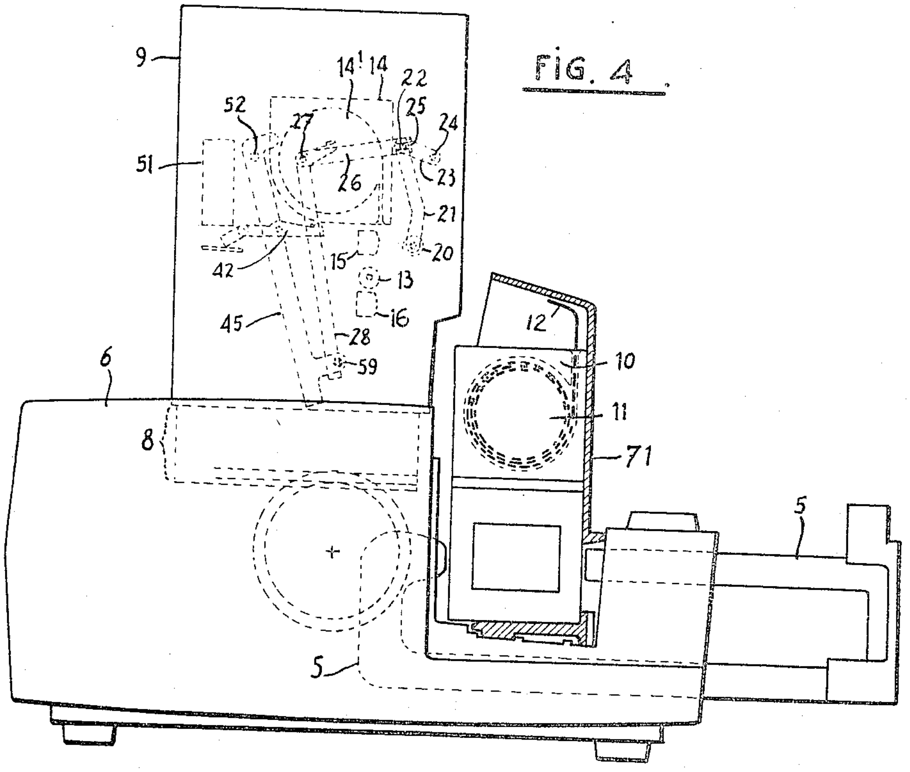
FIGS. 4 and 5 are respectively a rear view and plan view of the combined apparatus, the sound cassette being shown in the position which it has in the magazine before being brought to the operative position.
Figure 5:
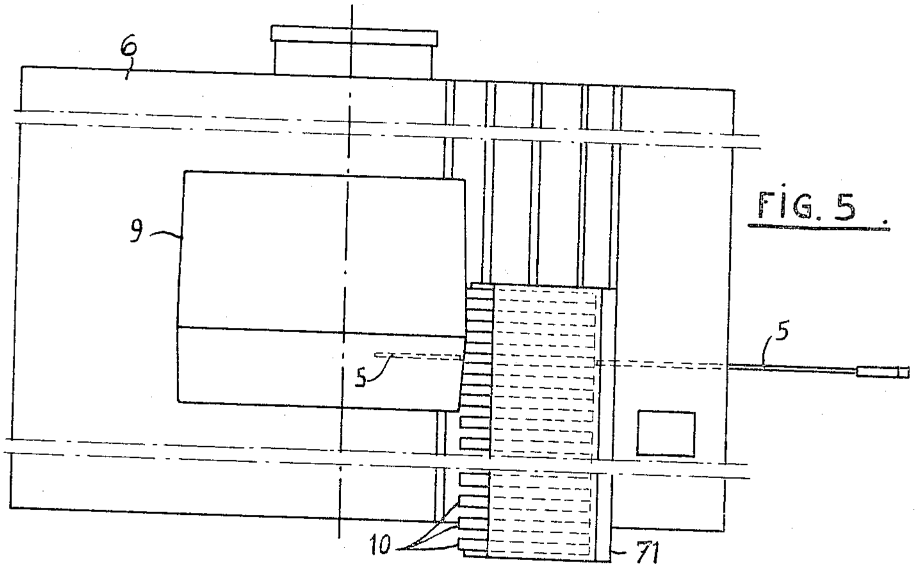
Figure 6:
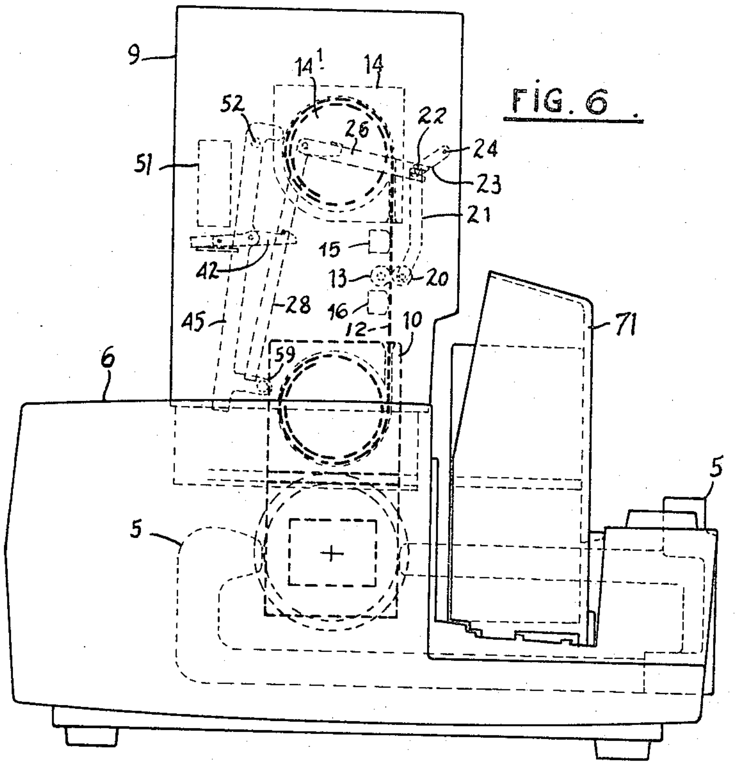
FIGS. 6 and 7 are respectively a rear view and plan view of the combined apparatus, the sound tape being shown in the operative position.
Figure 7:
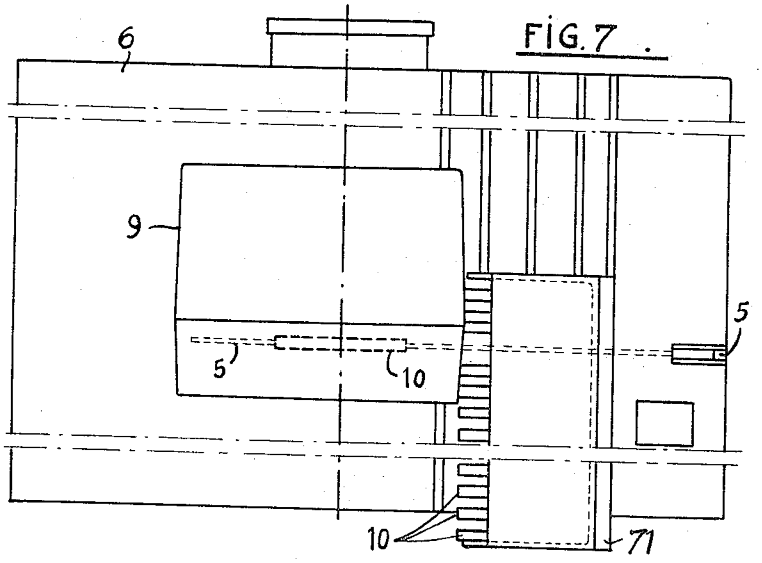
Figure 8:
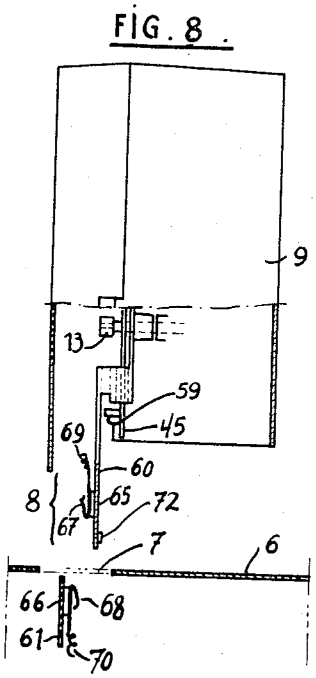
FIGS. 8–16 are explanatory views showing how the foot of the device for recording and playing sound tapes co-operates with the receptacle in the optical projector, the sound device being in the inoperative position in FIG. 8 and being fitted to the projector in FIGS. 9–11.
Figure 10:
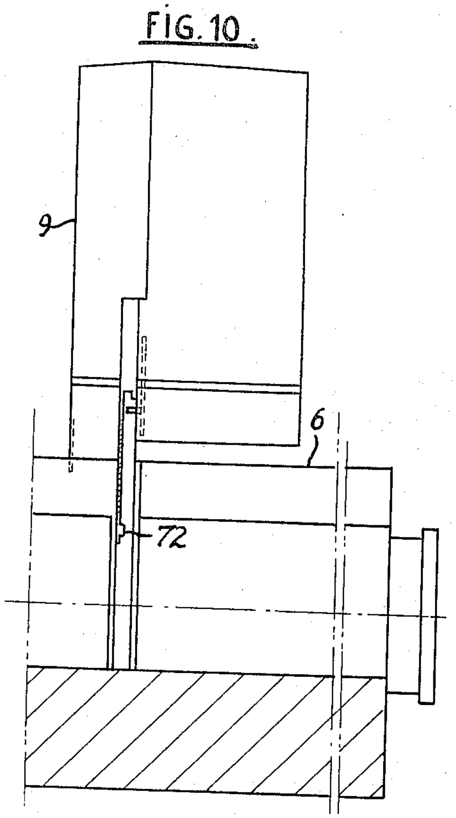
Figure 9:
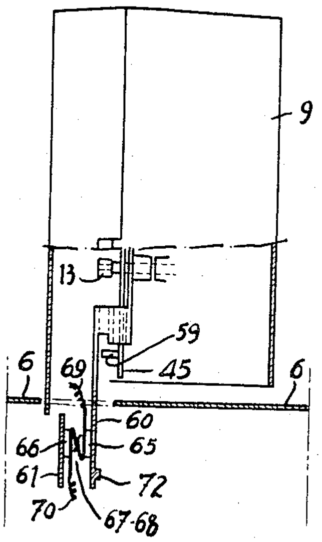
Figure 11:
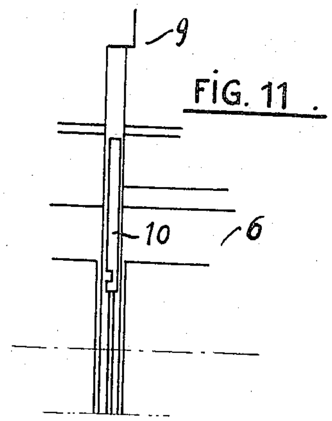

FIGS. 4 and 6 diagrammatically show the main items of the unwinding and winding device disclosed by the aforesaid Belgian Patent No. 647,272 filed Apr. 29, 1964.

A stationary magazine 14 secured to the frame 60, with a circular recess $14^1$ placed to receive the tape during operation when the system 10 formed by the cassette and the slide frame has been brought to a position for playing or recording (FIG. 6);

A roller 13 for driving the tape, the roller 13 being disposed between the magazine 14 and the cassette 10 when the same is in its operative position;

Playing and recording heads 15, 16 whose reading surfaces are aligned in the same plane as one another;

A roller 20 co-operating with the tape-driving roller 13 and mounted on a lever 21 pivoted at its other end to a pivot 22 borne by a lever 23 pivoted to a pivot 24 secured to the frame, the lever 23 co-operating with a fork 25 formed at the end of a lever 26 pivoted to a pivot 27 secured to the frame, a lever 28 also being pivoted to the pivot 27, the lever 28 co-operating with a safety switch (not shown);

Another lever 45 having at the bottom an abutment 59 operated by the cassette when the same is brought to its operative position, and An end-of-work electromagnet 51.

Figures 12, 13:
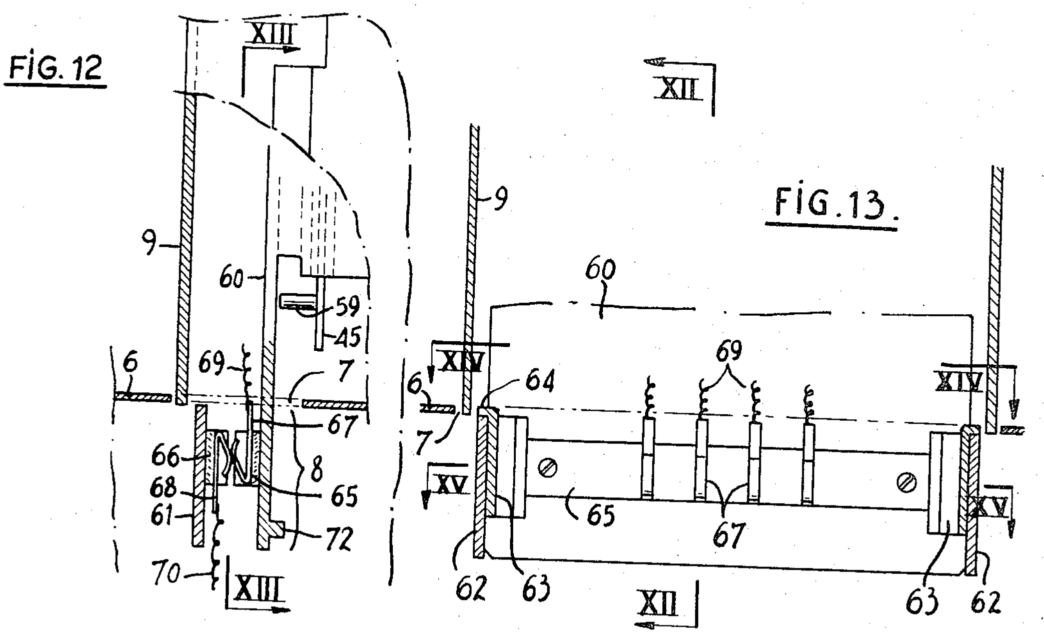
Figure 14:
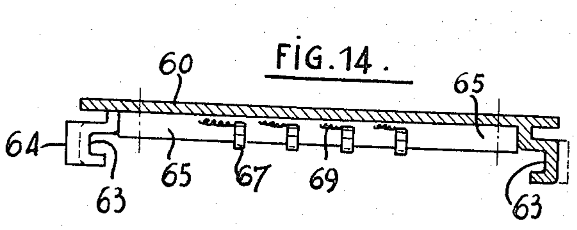
Figure 16:
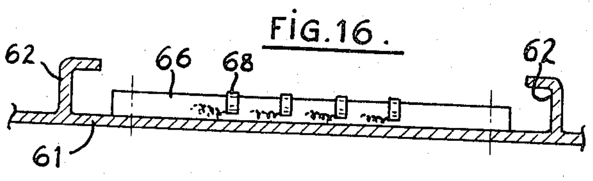
Figure 15:
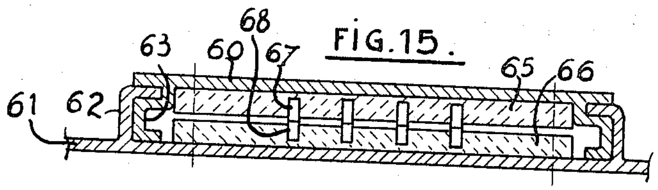

In the example shown (FIGS. 12 and 13), the foot 8 forms a downwards prolongation or extension of the frame 60 and is adapted to engage in a receptacle 61 adapted to receive it and position it on the projector. The receptacle 61 comprises securing members 62 (FIGS. 15 and 16) co-operating in shape and dimensions with section elements 63 forming part of the foot 8. The element 63 has abutments 64 adapted to co-operate with the members 62 and serving to limit downwards sliding of the casing 9.

Secured to the foot 8 and receptacle 61 are insulating strips 65, 66 each having rubbing contacts 67, 68 which contact one another when the foot 8 is received in the receptacle 61. The function of the contacts 67, 68 is to interconnect various electric circuits of the projector and of the sound device, inter alia the supply circuit and circuits associated with inter-relation of the reciprocal functions of the optical projection system and the sound device.

Figure 1:
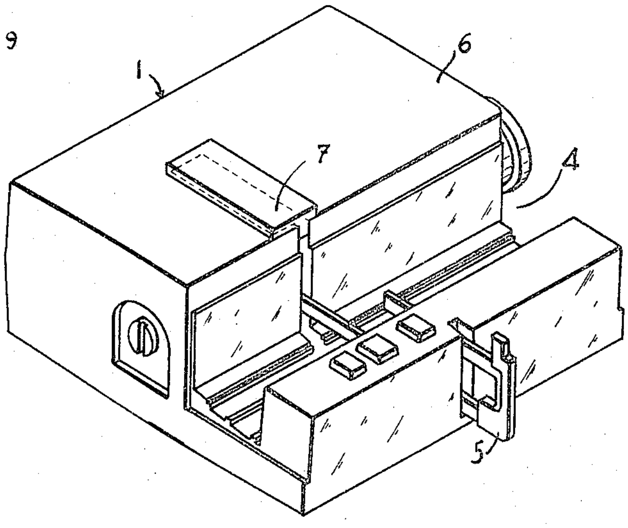
FIG. 1 is a perspective view of a conventional slide projector having provision for ready association of a device for recording or playing sound tapes.
Figure 2:
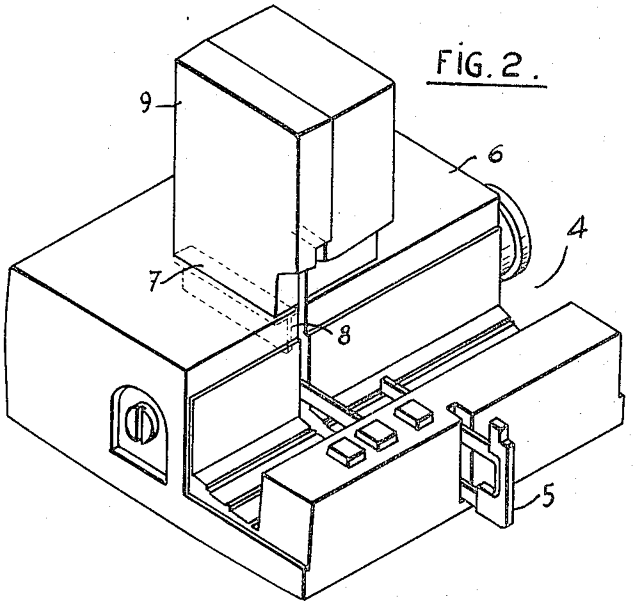
FIG. 2 is a perspective view in which the projector shown in FIG. 1 has been fitted with a device for recording or playing sound tapes.

As can be imagined, when it is required to add to a slide projector, of the kind shown in FIG. 1, a device for recording and playing sound tapes each stored in a recess a slide mounting frame, the frames 10 (FIG. 4) are placed in a magazine 71, such as the magazine shown in FIGS. 4 and 6, and the slides are moved by means of the slider 5 shown in FIG. 1. The sound device is positioned as shown in FIG. 2; when the foot 8 has been introduced through the aperture 7 into the receptacle 61, the members 62 receive and accurately locate the elements 63; the abutments 64 thereof engage with the top part of the members 62. The projector and the sound device are therefore located relatively to one another in three dimensions chosen to make the operative position of the sound elements of the slide relatively to the sound device coincide with the operative position of the slide relatively to the optical projection device.

When a sound cassette is moved to the operative position, it is moved by the slider 5 and guided by the conventional means in the projector for guiding "silent" slides and by a tongue 72 which is disposed on the frame 60 and which is adapted to co-operate with a groove in the mounting of the "sound" slide.

As disclosed in Belgian Patent No. 647,272, during this sliding movement the cassette acts on the abutment 59 of the lever 45 and at the end of its sliding movement reaches an operative position in which all the elements of the sound device are positioned to effect recording or playing back of the tape in the cassette which in the event can correspond to a part of the slide frame.

In a combined apparatus of this kind, the slide projector and the sound device can be so combined that the projector retains all its conventional functions for projecting conventional slides; the fact that the slide and the recess for the sound tape are in registration with one another and that the optical and sound equipment are in corresponding registration with one another provides the advantage that, when the slide frame is in the operative position relatively to the means for projecting the slide, the cassette is in the operative position in relation to the device for recording or playing the tape stored in the cassette. Also, the movement of the sound tape to the operative position, such movement resulting from the movement of the slide into the optical device of the projector, is effected by the conventional means (slider 5) provided for this purpose.

The invention enables the owner of any conventional slide projector to convert his projector readily and economically for the projection of sound slides, although he can use the projector whenever he wants to for conventional "silent" slides. Clearly, each element retains its independence so that, inter alia when they are separated from one another, the various devices can perform their own basic functions. For instance, if the foot 8 of the sound device is engaged in a receptacle 61 provided in a base having independent supply means, such as batteries, the sound device can be used as a recorder of a cassette sound tape, for instance, at the time when the slides are actually being photographed.

What I claim is:

1. Apparatus comprising a slide projector including a projector casing having a channel for receiving a slide magazine in which a plurality of slide frames can be stored, a slide carrier which is reciprocally movable for moving slides from said slide tray to an operative projecting position in the projector and then returning such slides to the slide tray; each slide frame comprising a portion with a recess for storing a sound tape, means detachably mounted on said projector casing as a separable unit for recording and playback of sound tape, and means whereby when the slide frame is in said operative position, a tape in the recess of said slide frame is in an operative position relative to the means for recording and playback of such tape.

2. Apparatus according to claim 1 in which the common operative position of the slide and the tape is the result of a registered position of the slide end of the recess for the sound tape and of a corresponding registered position of the projector casing and of the means for recording and playback of the sound tape.

3. Apparatus according to claim 1 wherein said recording and playback means has operative and inoperative positions and is normally inoperative and rendered operative when a slide frame is moved to its operative position.

4. Apparatus according to claim 1 comprising means on the projector casing and the recording and playback means for their detachable engagement.

5. Apparatus according to claim 1 in which the projector casing is provided with a slot in the top thereof and a receptacle beneath said slot, the recording and playback means including a foot which is received in said slot and engages said receptacle.

6. Apparatus according to claim 5 wherein said recording and playback means comprises a frame with a depending extension constituting said foot.

7. Apparatus according to claim 5 wherein said foot and receptacle include means for positioning the recording and playback means and the projector casing in a specific relative three dimensional relation to insure coincidence between the operative position of the slides and the operative position of the respective tape relative to the recording and playback means.

8. Apparatus according to claim 5 comprising abutment means on said foot for limiting the insertion of the foot into the receptacle.

9. Apparatus according to claim 5 wherein said foot and receptacle include respective contact elements which abut one another when the foot is received in the receptacle.

10. Apparatus according to claim 9 wherein said contact elements serve for the power supply to the recording and playback means, the latter including recording and playback elements which are separate from the projector and can be used independently thereof.

References Cited

UNITED STATES PATENTS

| | | | |
|---|---|---|---|
| 3,176,580 | 4/1965 | Metz | 88—28 |
| 3,183,774 | 5/1965 | Kurz | 88—28 |
| 3,224,828 | 12/1965 | Chytil | 352—27 |
| 3,256,775 | 6/1966 | Hall | 88—28 |
| 3,258,867 | 7/1966 | Hall | 88—28 |

FOREIGN PATENTS

| | | |
|---|---|---|
| 1,180,962 | 11/1964 | Germany. |

JOHN M. HORAN, *Primary Examiner.*

NORTON ANSHER, *Examiner.*

RICHARD M. SHEER, *Assistant Examiner.*